Figure 1:
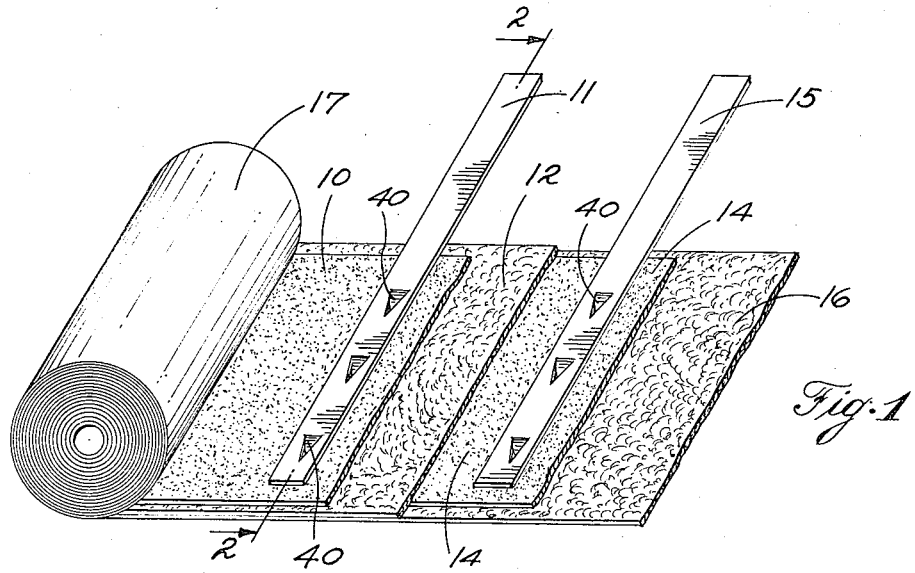

April 3, 1951 J. B. BRENNAN 2,547,371
ELECTROLYTIC CONDENSER
Filed Sept. 18, 1947 2 Sheets-Sheet 1

INVENTOR.
JOSEPH B. BRENNAN
BY Bosworth + Sessions
ATTORNEYS

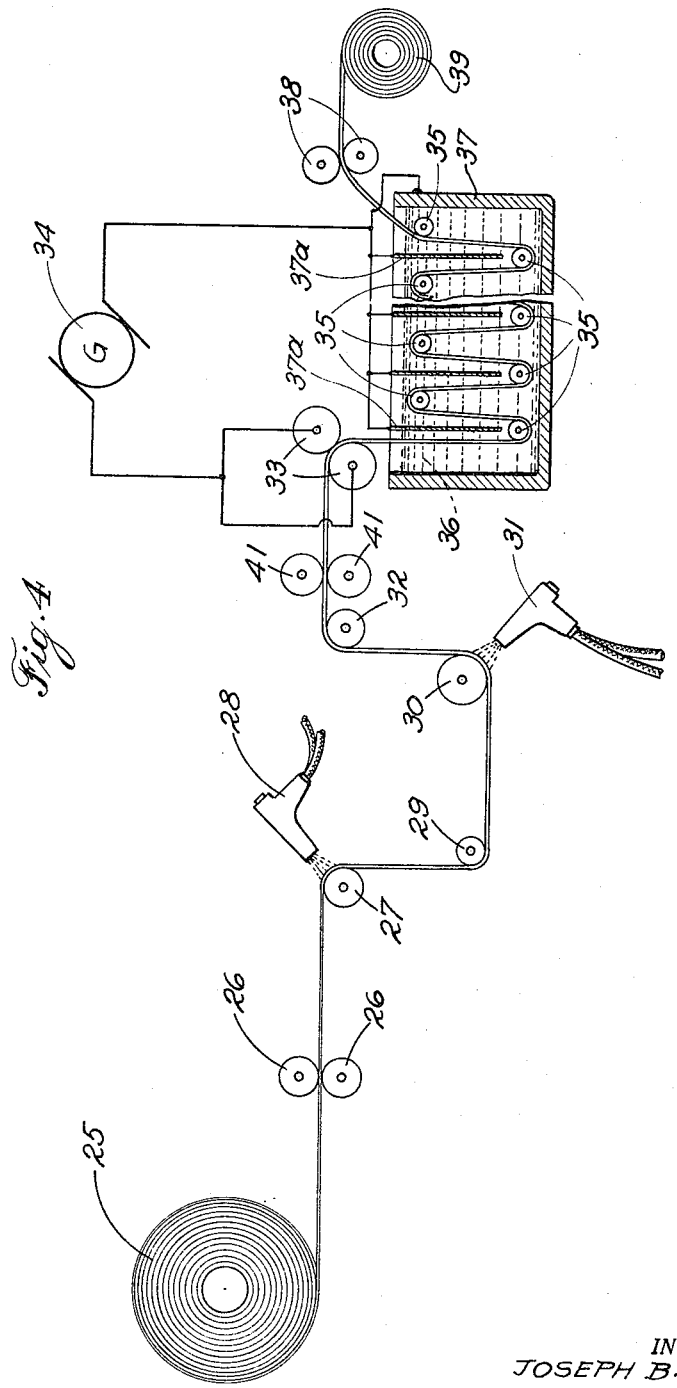

Patented Apr. 3, 1951

2,547,371

UNITED STATES PATENT OFFICE 2,547,371

ELECTROLYTIC CONDENSER

Joseph B. Brennan, Bratenahl, Ohio, assignor to Everett D. McCurdy, trustee

Application September 18, 1947, Serial No. 774,829

3 Claims. (Cl. 175—315)

This invention relates to electrolytic condensers of the type embodying electrodes of spray deposited metal, and the present application constitutes a continuation in part of my copending application Serial No. 591,909, filed May 4, 1945, and of my copending application Serial No. 419,157, filed November 14, 1941, now Patent No. 2,446,524, which in turn is a continuation in part of my application Serial No. 158,105, filed August 9, 1937, now Patent No. 2,280,789, issued April 28, 1942.

In my prior applications aforesaid, I disclosed electrolytic condensers embodying electrodes composed of porous layers of spray deposited material on flexible porous base materials such as woven gauze, aluminum screen, filter paper and glass cloth. The present application relates to condensers in which the layers making up the electrodes comprise minute cohering particles of metal deposited upon very thin, soft and porous paper strips and in which the spacers are composed of similar thin and porous paper. By such a construction, condensers which are porous substantially throughout are obtained; such condensers, in addition to having very high capacity per unit of volume, which results from the nature of the electrode surfaces and the thinness of the electrode strips, also have other advantageous characteristics which have not heretofore been possible of attainment.

Thus, condenser assemblies made according to my invention are of such a porous nature that the impregnation of the assemblies with electrolyte can be carried out rapidly merely by immersing the assemblies in electrolyte, all of the components of the condenser assemblies being of such a capillary nature that the electrolyte is drawn into the assemblies in a few minutes. Furthermore, the condensers have lower power factor than any prior condensers of which I am aware. Efficiency of operation is also maintained under a wide range of temperatures; condensers made according to my invention lose less than 10% of their capacity upon reduction in temperature from 70° F. to −13° F. as distinguished from the loss of 20% or more in prior types of condensers utilizing the same electrolyte. My condensers also have the very desirable characteristic of withstanding overloads and surges of current far better than any prior types of electrolytic condensers. For reasons of which I am not entirely aware, condensers made according to my invention do not become short circuited when subject to large overloads and under the influence of a large overload for a short period of time, the condensers merely pass a greater amount of leakage current, and upon reduction of the voltage to normal value, normal operation of the condensers is regained very promptly. If the overload is imposed for a long enough period of time to evaporate substantial quantities of moisture from the electrolyte, the condenser does not flash or become short circuited, but acquires the characteristics of a resistor.

Even though the condenser may be subjected to such a prolonged overload as to substantially destroy its operability as a condenser, nevertheless it still will function to prevent the passage of large amounts of current, and thus it is unlikely that failure of one of my condensers under overload will result in damage to other components of the apparatus with which it is associated. By large overloads, I mean subjecting the condensers to voltages one and one-half times and even approaching twice the voltage at which the condenser is designed to operate. For example, a condenser designed for operation at 400 volts will withstand a voltage of 800 volts for a short period of time with no evidence of substantial damage, and if the voltage is imposed for a longer period of time and the electrolyte destroyed by evaporation of the liquid therefrom, then the condenser acts in the manner of a resistor. Lower voltage condensers such as those designed for operation at 115 volts have an ability to withstand surges of the order of 200 volts without substantial damage, and if the overload is continued, the condensers will frequently form additional dielectric film thickness and operate at the higher voltage without undue leakage.

Figure 2:
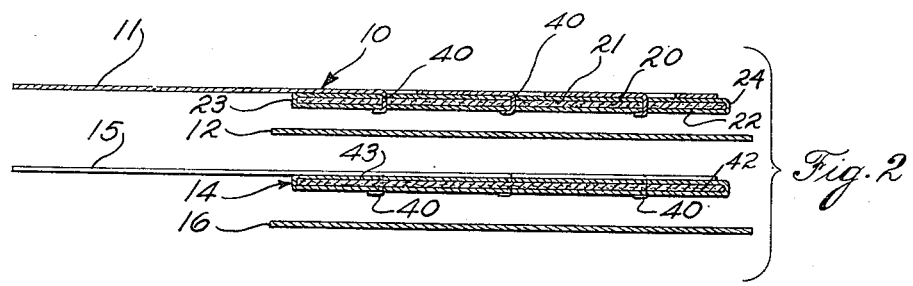
Figure 3:
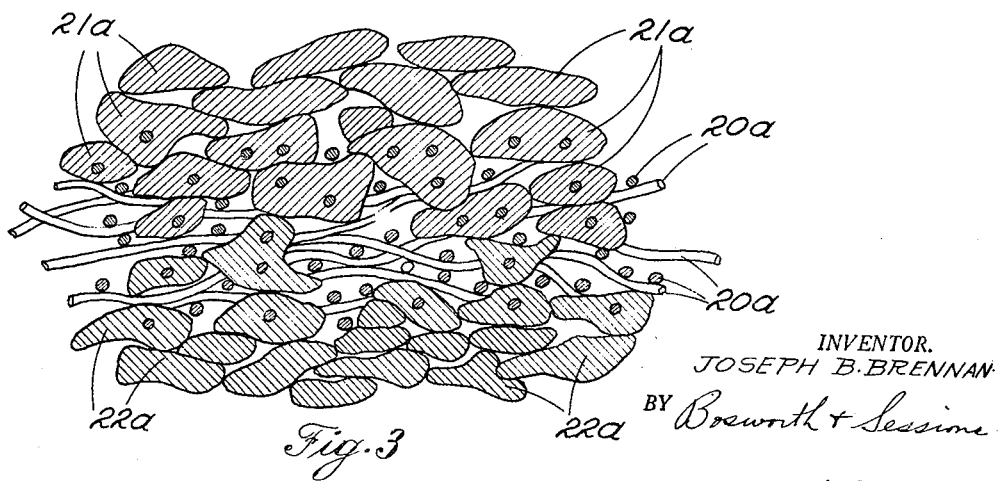

A preferred form of condenser for giving the aforesaid advantageous results is illustrated in the drawing in which Figure 1 shows a rolled-type condenser embodying my invention with the electrodes partially unrolled in order to show the construction of the condenser; Figure 2 is a cross section through the condenser shown in Figure 1 with the elements separated somewhat for convenience of illustration; Figure 3 is a greatly enlarged cross-sectional view of a small piece of an electrode made according to my invention; and Figure 4 diagrammatically illustrates an apparatus for producing my electrodes. The drawing is necessarily somewhat diagrammatic and no effort has been made to draw the parts to scale.

As shown in the drawing, a condenser embodying my invention and adapted for direct current service may comprise an anode 10 having a terminal 11 secured thereto, spacer 12, a cathode 14 having a terminal 15 secured thereto and another spacer 16. All of these elements may be enrolled into substantially cylindrical form as indicated at 17, and the enrolled condenser may be enclosed in a suitable can or casing (not shown) from which the terminals project. The general configuration of the condenser may be conventional and may be varied to suit different requirements. Also, it will be understood that more than two electrodes or plates may be provided and that my condensers may be adapted to alternating current services if desired.

In order to obtain the desired porosity of the condenser, the conductive layers of the anode and cathode are deposited upon paper strips, and the spacers 12 and 16 comprise paper strips. Preferably the paper in each case is a porous, soft paper such as a lightly calendered kraft paper. The paper should be free from chlorides and sulfates and other impurities which would contaminate the condenser; the paper sold in the trade as "electrolytic condenser kraft" paper is well suited to my purposes. The spacers 12 and 16 are composed of paper preferably from 0.002 to 0.004 inch thick (electrolytic condenser kraft paper is suitable), although the thickness of the spacers is not critical so long as they are thick enough properly to separate the electrodes or plates 10 and 14 and are not so thick that they add undue bulk to the condenser assembly. It will be noted that, as shown in Figure 2, the spacers are slightly wider than the anode 10 and cathode 14 to prevent contact between the edges of these electrodes.

In making the anode 10, the paper strip 20 on which the conductive metal layers 21 and 22 are deposited preferably has a thickness of only 0.001 inch, and it is possible to employ papers as thin as 0.0005 inch as the base. The thickness, however, preferably should not exceed 0.0003 inch, as additional thickness merely adds bulk to the condenser and decreases the flexibility of the electrode without any corresponding advantage. On each side of the strip there are porous, flexible conductive layers 21 and 22 composed of finely divided particles of film-forming material which cohere to each other and adhere firmly to the base strip. These layers must be thick enough to be conductive and thin enough to be readily flexible. I have found that layers on each side of about 0.0025 inch are very satisfactory, and I prefer that the thickness of each layer be not more than 0.003 inch. The total thickness of the anode preferably does not exceed 0.007 inch. The layers should be of substantially uniform thickness throughout, and the layers extend around the edges of the paper base as indicated at 23 and 24; thus, the conductive layers are in electrical contact with each other along their edges throughout their lengths.

Preferably the layers are produced by spraying finely divided molten particles of film-forming material such as aluminum of 99.8% purity or better upon the paper strip by moving the paper strip past the nozzle of the spraying apparatus at a speed which is correlated with the rate of spraying so that a single pass of the strip past the spraying nozzle produces a deposit of the desired thickness. The spraying operation is carried out first on one side of the strip and then on the other, and the spray nozzle is adjusted to produce a spray slightly wider than the strip so that the edges are covered as indicated diagrammatically in the drawing. The strip is moved at a uniform velocity past the spray nozzle, and the molten metal is discharged at a uniform rate from the spray nozzle, the velocity of the strip and the rate of discharge being correlated to give the desired thickness of, for example, 0.0025 inch on each side.

The operation is carried out continuously and rapidly, preferably at a speed of about 15 feet per minute. After the spraying operation is completed, the anode is formed in strip form by passing it continuously through a bath containing a film-forming electrolyte at a temperature of approximately 90° C. and by passing a unidirectional current through the strip.

If the spraying is carried out by an apparatus such as a Schoop metallizing gun, the gun is positioned far enough away from the paper so that the paper is not carbonized by the flame. For example, I have obtained good results by spraying on a strip moving at the speed of 15 feet per minute with a metallizing gun supported 8½ inches from the strip, using ⅛ inch aluminum wire of 99.8% purity, fed at a speed of 40 inches per minute, using an oxygen pressure of 40 lbs. per square inch and propane pressure of 40 lbs. per square inch in the gun, and employing compressed air under a pressure of 60 lbs. per square inch to atomize the molten aluminum and project the particles against the strip. By spraying layers about 0.0025 inch in thickness on both sides of the strip in the manner noted above, I obtain porous, flexible anodes which have a capacity per unit of area of from eight to ten times the capacity of an electrode of plane high-purity aluminum foil would have under the same test conditions.

It is to be noted that the soft, porous paper on which the metal is deposited has very little strength when wet, and in fact will disintegrate when subjected to handling in the formation electrolyte at 90° C. Thus, the strip itself does not have anything like the strength required to permit it to be drawn through the formation bath over the several guide rollers necessary to guide the strip through the bath. However, the spraying operation carried out as described above causes the molten or plastic particles of aluminum to impinge upon the paper with sufficient force that the particles are flattened slightly as they strike and many of them are embedded in the paper and become firmly bonded to the underlying paper fibers. Then as the spraying operation is carried out progressively with the paper moving past the spray nozzle, succeeding particles are deposited upon the previously deposited particles before the previously deposited particles are completely chilled, somewhat in shingle or fish-scale fashion, although the layers are several particles thick, producing in a single pass through the spray a structure in which particles are bonded to adjacent particles and are also bonded to underlying paper fibers.

Figure 3 diagrammatically illustrates the nature of the resultant material. Here the paper fibers are indicated at 20a, the aluminum particles making up the layer 21 are indicated at 21a, and the aluminum particles making up the opposite layer 22 are indicated at 22a. Particles in each layer are bonded together with interstices, passages and the like between the unbonded portions of the particles. It will be noted that some of the particles 21a penetrate substantially through the strip and are embedded within the fibrous structure of the paper strip, some of the particles being locked to two or more fibers. Similarly some of the particles 22a penetrate into the strip and are embedded therein. Thus, some of the particles 22a are bonded through the paper strip to some of the particles 21a. The penetration of the aluminum particles into the paper strip is such that after the paper strip has been sprayed on one side, it is possible to see aluminum particles through the paper from the unsprayed side; when the other side is sprayed, it is these penetrating particles of each layer that are bonded to each other. This bonding through the strip not only further reinforces the paper layer, but also serves to retain the particles on the layer and to provide many conductive paths for the passage of electricity between the layers on opposite sides of the paper strip, these paths being in addition to the paths provided by the contact between the layers around the edges of the strip as at 23 and 24.

The penetration of the particles into the paper strip is such that the spacing between the two deposited layers is less than the original thickness of the paper. For example, I have found that if electrolytic condenser kraft paper having a thickness of 0.002 inch is sprayed with a layer in the manner described above such that the total thickness of the paper and the sprayed layer is 0.004 inch, and the paper then burned out or otherwise removed, the average thickness of the sprayed layer is approximately 0.003 inch, indicating a penetration of the layer into the paper of about 0.001 inch, although, as noted above, some of the particles of the layer penetrate farther than this and some penetrate lesser distances or not at all.

The bonding of the particles to each other and to the paper fibers results in a reinforcement of the paper by the spray deposited layers. The bonds between the paper fibers and the metal particles and the bonds between the metal particles do not seem to be substantially affected by the hot forming electrolyte, and thus the soft paper, which may be of low wet strength, is given sufficient additional wet strength by the spraying operation to permit it to be handled in the usual manner in formation without requiring any special precautions and without danger of tearing or breaking. This reinforcement of the strip by the adherent coatings makes it possible to use porous, soft paper which the electrolyte readily penetrates and to which the deposited coating firmly adheres.

The paper preferably is of such thinness and softness that when the finished electrode is immersed in hot electrolyte, the paper will not swell enough to blister or crack the deposited metal. The porous soft paper after spraying is given greater strength by the embedded and bonded spray deposited particles than a hard calendered paper of the same composition and weight would have after spraying because the particles do not penetrate and adhere as well to the hard calendered paper. Thus, by using a softer, weaker paper to start with, I unexpectedly obtain an electrode that is stronger and more flexible when wet with a hot electrolyte than can be obtained by spraying layers of the same weight on a harder, stronger paper of the same general composition and thickness. Therefore, I am able to use a soft paper with low wet strength, although it is to be understood that papers of high wet strength may be employed so long as they are sufficiently soft and porous to admit of proper bonding with the spray deposited metal.

The deposited layers, produced in the manner described, are also uniformly highly conductive.

Thus, an anode strip 2¼ inch wide having two sprayed layers approximately 0.0025 inch in thickness has a conductivity such that a formation current of from 40 to 50 amperes at 550 volts may be applied to it without overheating the strip. The conductivity is sufficiently uniform that no localized spots of high resistance which would be subject to overheating are present, and the character of the deposited material is of such uniformity that the capacity per unit of area varies less than 10% from point to point lengthwise of the strip.

In Figure 4 of the drawing, I have diagrammatically illustrated an apparatus suitable for carrying out the spraying process just described. As shown in this figure, the strip 20 is fed from a supply spool 25 through a pair of rolls 26 and around the roll 27 which furnishes a backing for the strip while the spray from the spray gun 28 is directed thereagainst. The strip then passes around the guide roll 29 and the backing roll 30 where the other side of the strip is sprayed by means of the gun 31. Preferably the backing rolls 27 and 30 are cooled by water or other suitable fluid during the spraying operation, and while the sprayed particles penetrate the soft porous paper as described above, nevertheless the paper does not permit any substantial number of particles to pass through it and impinge upon the backing rolls. The spraying operation, therefore, does not have any substantial tendency to bond the paper to the backing rolls.

The guide roll 32 leads the strip to the pinch rolls 33 where an electrical connection is made between the metal coatings on both sides of the strip and the positive terminal of the direct current generator 34 which furnishes the formation voltage. From the rolls 33 the strip is guided in a multiplicity of passes by guide rolls 35 immersed in the formation electrolyte 36 in the tank 37, the tank 37 and copper electrodes 37a being connected to the negative terminal of the generator 34. The strip is drawn through the formation tank by the driven pinch rolls 38, and the sprayed and formed strip may then either be severed into appropriate lengths for electrodes or may be wound onto a take-up reel 39 as shown.

If desired, the sprayed strip may be subjected to a rolling operation by pressure rolls 41 to flatten and smooth the spray deposited layers and/or may be heat treated to anneal the particles. It is also contemplated that the spraying operation may be carried out in a non-oxidizing atmosphere if desired.

The electrodes are completed by cutting the strip into proper lengths, the length being determined by the amount of capacity desired in the condenser to be produced, and by securing a terminal 11 to each electrode. The terminal 11 is preferably composed of the same film-forming metal as is used in the spraying operation, thus, in the example given, the terminal preferably is composed of high purity aluminum foil of about 0.005 inch in thickness. The terminal is staked to the electrode by punching out triangular tongues in the terminal as indicated at 40, the tongues extending through both sprayed layers and the paper as shown in Figure 2, thus making good contact between the terminal and both sprayed layers.

The cathode 14 may be made in substantially the same manner as the anode 10, but preferably, for economy of material and to save space, the paper strip 42 of the cathode is provided with a sprayed layer 43 on only one side thereof. The paper strip preferably is identical with the strip used in the manufacture of the anode 10, but the spray deposited layer 43 may be slightly thicker than the spray deposited layers 21 or 22 on the anode, the preferred range of thickness on the cathode being from 0.0025 inch to 0.004 inch, and the total thickness of the cathode preferably being not greater than 0.005 inch. Here again, the sprayed layer reinforces the paper and gives it increased wet strength, which may be of importance if the cathode is wound into the condenser while wet.

In constructing the cathode, I preferably use the same aluminum, that is, aluminum of 99.8% purity or better, as was used in making the anode. While such aluminum is more expensive than ordinary commercial aluminum, there is such a small amount of aluminum used in the cathode that the added cost per condenser is practically negligible. It is advantageous to use the same metal for both anode and cathode as it eliminates the need for having two different kinds of stock on hand, and also the use of high purity aluminum for the cathode eliminates danger of contamination of the condenser by reason of impurities contained in the cathode. No difficulty with formation of a dielectric film on the cathode has been experienced, probably because of the very large effective area of the cathode and resultant low current density per unit of effective area.

The operation of making the cathode is carried out by spraying on one side of the strip in a continuous manner as described in connection with the anode. Thereafter, the cathode strip is severed into appropriate lengths, the cathode in a given condenser being of approximately the same length as the condenser anode. A terminal member 15 is attached to each length in the same manner as terminal 11 is attached to the anode. The assembly may be made by rolling up an anode, a cathode and separators into cylindrical form as shown; the assembly is then immersed in the final condenser electrolyte which may consist of a conventional boric acid-glycol electrolyte, which is viscous or pastey at ordinary room temperatures and which may be heated to increase its fluidity, for a period of 10 or 15 minutes in which time it will have absorbed by capillary action enough electrolyte to completely saturate the assembly. The condenser is then "aged" by applying current to it in order to form a dielectric film on the cut ends of the anode and on unformed portions of the anode terminal, this operation requiring only a few minutes. Then the assembly is removed from the electrolyte and placed in a conventional can or other container. The capillary attraction of the assembly for the electrolyte is such that sufficient electrolyte for the operation of the condenser is retained in the assembly as it is removed from the aging bath, and it is unnecessary to add any additional electrolyte after the assembly has been placed in the final container. While I have described my condenser as embodying pastey or viscous electrolytes, it is to be understood that more liquid electrolytes, as well as electrolytes that are solid at room temperatures may be employed; the solid electrolytes are liquified by heat to impregnate the condensers.

As noted above, condensers made according to my invention give remarkably good results. While all of the reasons for their advantageous operation are not entirely understood by me, it seems probable that at least some of the advantages flow from the fact that the spraying operation produces a finely roughened, yet uniform surface on the electrodes, the spray deposited layers are of substantially uniform thickness throughout and are of uniform conductivity throughout. Thus, the current density throughout the condenser is substantially uniform. The surfaces of both the paper separators and the sprayed electrodes are also generally flat; that is, there are no pockets or substantial variations in thickness such as occur with electrodes in which spray deposited layers are deposited on bases composed of woven cloth such as gauze or the like. Furthermore, the permeability of the electrode and of the separators is substantially uniform throughout. Thus, there are no pockets where there can be accumulations of gas; any gases generated in the operation of the condenser can find their way out of the assembly readily through relatively short paths because of the permeability of the entire assembly.

The porosity of the spray deposited material and the capillary nature of the electrodes and spacers is such that the wound condenser assembly acts like a blotter or sponge in absorbing electrolyte. The porosity of the assembly extends in radial as well as axial directions, and because of the porosity in all directions, the internal resistance of the assembly to the passage of ions and gases within the condenser is less than in previous types of condensers, resulting in condensers which are more efficient from an electrical standpoint and in which generation of gas has substantially no damaging effect.

The uniformity in thickness and in other characteristics means that each part of the condenser is subjected to substantially the same electrical load as every other part. This uniformity prevents overloading of localized areas in the condenser and eliminates hot spots and likelihood of local failure.

Those skilled in the art will appreciate that various modifications and changes can be made in my invention without departing from the spirit and scope thereof. It is therefore to be understood that my patent is not limited to the preferred form of the invention described herein or in any manner other than by the scope of the appended claims.

I claim:

1. An electrolytic condenser assembly comprising at least two flexible electrodes and interleaved spacers, each electrode comprising a sheet of soft, porous paper having a thickness of less than 0.003 inch and a porous conductive layer of finely divided metal particles coating the same, one of said electrodes constituting an anode and having layers of metal particles coating both sides thereof, the finely divided metal particles on the side of each layer engaging the paper sheet being embedded in the porous paper sheet and embracing and bonded to the fibers of the paper forming the sheet, some of the innermost embedded particles of metal of a layer projecting through the strip to the opposite side of the strip, all the particles of metal of one layer being bonded together, and some of the particles of metal of one layer of the sheet of paper coated on both sides being bonded to some of the particles of metal of the other layer, said metal coated paper sheets being reinforced and strengthened by the coatings of bonded metal particles and being capable of flexing without separation of the coatings from the sheets, said metal particles being composed of film-forming metal and having dielectric films formed thereon, the spaces each comprising a sheet of porous paper, the entire assembly being porous and evidencing capillarity substantially throughout and being impregnated with a viscous, film-maintaining electrolyte.

2. An electrode for electrolytic condensers comprising a strip of porous, soft paper having a thickness of less than 0.003 inch, and a porous conductive layer of finely divided particles of high purity aluminum coating each side thereof, the finely divided particles of aluminum on the side of each layer engaging the paper strip being embedded in the porous paper strip and embracing and bonded to the fibers of the paper forming the strip, some of the innermost embedded particles of aluminum of one layer projecting through the strip to the opposite side of the strip, all of the particles of aluminum of one layer being bonded together and some of the particles of aluminum of one layer being bonded to some of the particles of aluminum of the other layer, thereby forming an aluminum coated paper strip reinforced and strengthened by the coating of bonded aluminum particles and capable of flexing without separation of the coating from the strip.

3. An electrode for electrolytic condensers comprising a strip of porous, soft paper having a thickness of less than 0.003 inch, and a porous conductive layer of finely divided particles of high purity aluminum coating one side thereof, the finely divided particles on the side of the layer engaging the porous paper strip being embedded in the porous paper strip and embracing and bonded to fibers of the paper forming the strip, some of the innermost embedded particles of aluminum projecting through the strip to the opposite side thereof, all of said particles being bonded together thereby forming an aluminum coated paper strip reinforced and strengthened by the coating of bonded aluminum particles and capable of flexing without separation of the coating from the strip.

JOSEPH B. BRENNAN.

REFERENCES CITED

The following references are of record in the file of this patent:

UNITED STATES PATENTS

| Number | Name | Date |
| --- | --- | --- |
| 2,177,819 | Booe | Oct. 31, 1939 |
| 2,280,789 | Brennan | Apr. 28, 1942 |
| 2,290,338 | Koehring | July 21, 1942 |
| 2,295,759 | Scheer | Sept. 15, 1942 |
| 2,297,607 | Blackburn | Sept. 29, 1942 |
| 2,310,932 | Brennan | Feb. 16, 1943 |
| 2,375,211 | Brennan | May 8, 1945 |
| 2,384,500 | Stall | Sept. 11, 1945 |
| 2,404,824 | Booe | July 30, 1946 |
| 2,412,201 | Brennan | Dec. 10, 1946 |

FOREIGN PATENTS

| Number | Country | Date |
| --- | --- | --- |
| 543,505 | Great Britain | Feb. 27, 1942 |